Figures 1, 2:
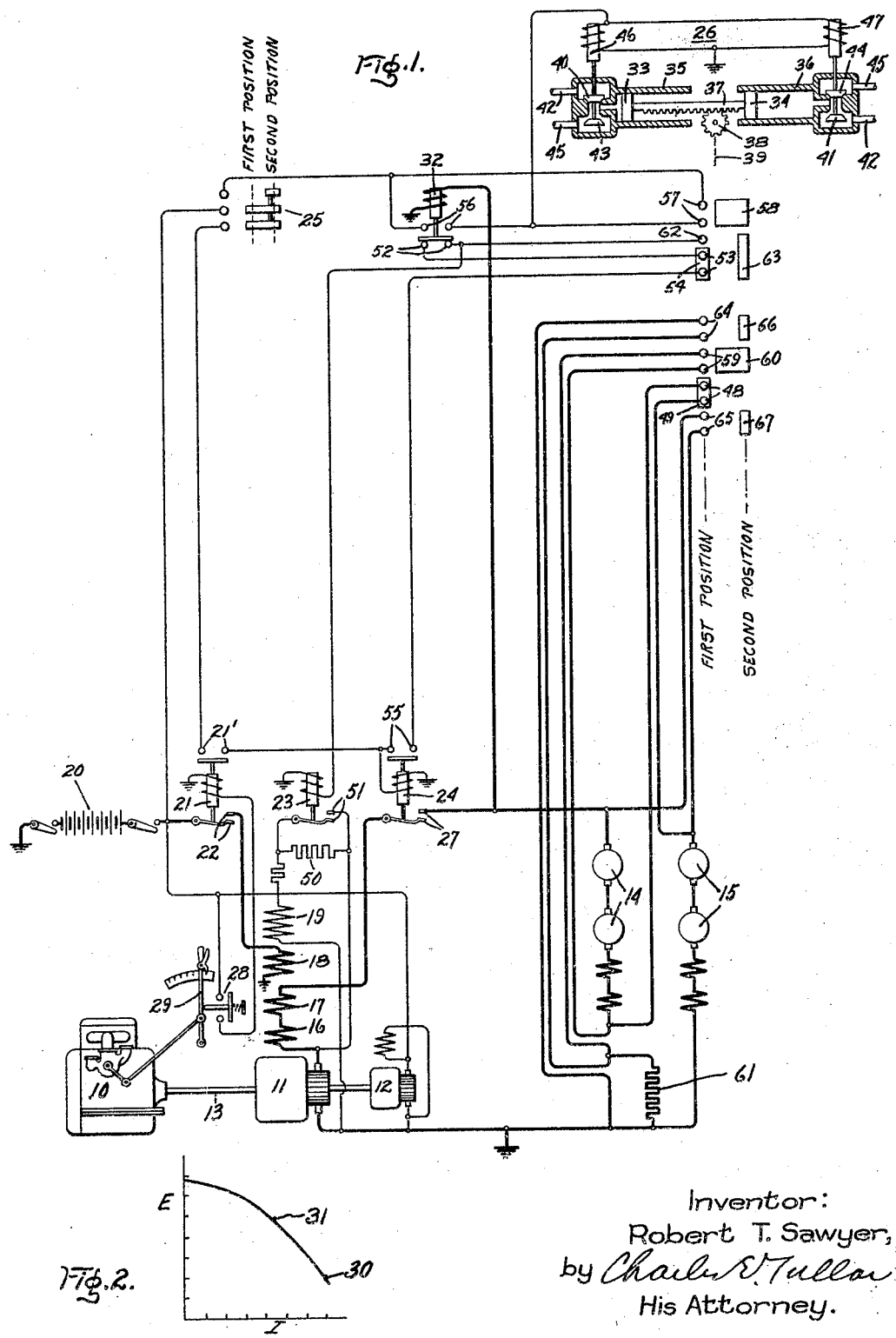

Aug. 16, 1932.        R. T. SAWYER        1,871,472
POWER SYSTEM
Filed Aug. 30, 1929

Inventor:
Robert T. Sawyer,
by Charles E. Tullar
His Attorney.

Patented Aug. 16, 1932

1,871,472

UNITED STATES PATENT OFFICE

ROBERT T. SAWYER, OF ERIE, PENNSYLVANIA, ASSIGNOR TO GENERAL ELECTRIC COMPANY, A CORPORATION OF NEW YORK

POWER SYSTEM

Application filed August 30, 1929. Serial No. 389,436.

My invention relates to power systems and is particularly applicable to self-propelled vehicles of the type wherein a source of motive power, as an engine, is arranged to drive an electric generator for supplying current to motors operatively connected to the axles of the vehicle.

In a self-propelled vehicle of the aforesaid type, it has been the usual and well-known practice to connect the driving motors to the generator in series during the starting period of the vehicle, or when an exceptionally heavy load is thrown on the motors, as in ascending a steep grade, in order that high torque may be available and to transfer the motor connections from series to a series-parallel arrangement when the vehicle has attained a predetermined speed, or when the load on the generator has decreased so that it is operating at a higher or more efficient voltage. The aforesaid transfer of connections has in general been performed manually with the result that it rests with the operator's judgment when the most suitable time for transfer of the connections occurs.

Previous types of control utiliting a current controlled device for transferring the motor circuits from series to parallel in response to the motor load current are not adapted for use in connection with self-propelled vehicles of the aforesaid type, since the load current may be at a voltage at which the motor connections should remain in series for most efficient operation of the system.

It is a principal object of my invention to provide means responsive to the generator voltage or a voltage in the electrical system of the vehicle proportional thereto for effecting transfer of the motor circuit connections in accordance with the operating requirements thereof.

It is a further object of my invention to provide a voltage responsive relay for automatically transferring or retransferring the motor circuits between series and series-parallel arrangements in accordance with the voltage characteristic of the generator.

My invention will be more fully set forth in the following description referring to the accompanying drawing, and the features of novelty which characterize my invention will be pointed out with particularity in the claims annexed to and forming a part of this specification.

Referring to the drawing, Fig. 1 is a diagrammatic illustration of the operating system of a self-propelled vehicle, and Fig. 2 is a graphical illustration of the voltage characteristic of the generator thereof.

Referring to Fig. 1, there is illustrated an electrically driven vehicle including an internal combustion engine 10, or other suitable source of power, arranged to drive a generator 11, an exciter 12 mounted upon a common drive shaft 13, and driving motors 14 and 15 coupled to the wheels of the vehicle. The excitation system of the generator 11 comprises a commutating field exciting winding 16, a series differential field exciting winding 17, a separately excited field exciting winding 18, and a shunt field exciting winding 19 which is connected across the generator. The field exciting winding 18 is arranged to be connected to a battery 20, and the commutating and differential field exciting windings are arranged to be connected in circuit with the motors 14 and 15.

When the engine is stopped or the vehicle is running at idling speed it is desirable to disconnect the separately excited field from the battery and to disconnect the motors from the generator. It is preferred to do this by an arrangement controlled by the engine throttle. This arrangement includes a relay 21 having contacts 22 which control the circuit between the battery 20 and the field exciting winding 18, and contacts 21' which control the energization of a relay 24. The circuit between the battery 20 and the relay 24 includes a master switch 25 which is connected to a controller 26 for the driving motors 14 and 15 so as to maintain the motors in series when this master switch is in its first position, and so as to provide for automatic change of the motor circuit connections from series to parallel in response to generator voltage in the second position, as will be hereinafter more fully explained. It will be understood, of course, that the series connection of the motors is not desired except for heavy load, and that the master switch will ordinarily remain in the second position. The relay 24 is provided with contacts 27 for controlling the circuit between the motors 14 and 15 and the generator 11. The relay 21 is controlled by a switch 28 which is arranged in such relation to a throttle lever 29 of the engine that when the throttle is closed the switch 28 is opened so as to deenergize the relays 21 and 24, and when the throttle is opened to start the vehicle these relays are energized. It will thus be seen that by this arrangement the battery 20 and the driving motors are disconnected from the field exciting winding 18 and the generator respectively, when the engine throttle is closed and connected thereto when the engine throttle is opened to start the vehicle.

Referring now more particularly to Fig. 2, when the vehicle is started the motors, which will be drawing heavy current due to the large starting torque imposed upon them, will operate at a comparatively low voltage on the voltage characteristic curve, as at some point 30. As the vehicle accelerates in speed, the counter electromotive force of the motors increases with resultant decrease of current until the voltage has risen to some point as at 31. If it be assumed, therefore, that a voltage approximate to that at point 31, or a voltage proportional thereto, is the most suitable for transferring the motor circuit connections from the series to a series-parallel arrangement, this transfer should take place at about this voltage and no other. To this end, there is provided a voltage responsive device which shall operate at approximately the voltage indicated at 31 for transferring the motor circuit connections from series to series parallel.

In accordance with my invention I obtain this automatic transfer of the motor circuit connections by providing a voltage relay, which is connected across the generator 11, for operating the controller 26 in response to a predetermined generator voltage. In the present embodiment of my invention this control arrangement includes a voltage responsive relay 32 connected through contacts 27 of relay 24 across the terminals of the generator 11 and adapted to be actuated at approximately the generator voltage indicated at 31 in Fig. 2.

The controller 26 is always in either its first position which connects the driving motors 14 and 15 in series with the generator 11, or its second position which connects the motors in parallel with the generator 11, and it is actuated from one to the other of these positions by a fluid motor. This fluid motor includes pistons 33 and 34 arranged in cylinders 35 and 36. The pistons are rigidly connected to each other by a gear rack 37 which meshes with a pinion 38 secured to an actuating shaft 39 of the drum controller. Operation of the pistons is controlled by valves 40 and 41 which are arranged to admit fluid under pressure from the conduits 42 to the cylinders, and are directly connected to valves 43 and 44 which are arranged to open the cylinders to exhaust conduits 45 when the valves 40 and 41 are closed. The valves 40 and 43 are controlled by a solenoid 46 and the valves 41 and 44 are controlled by a solenoid 47. It will be apparent that when the solenoids 46 and 47 are deenergized the drum of the controller and the pistons of the motor will be in its first position, as shown in Fig. 1, and that when the solenoids are energized the controller will be actuated to its second position.

The drum of the controller 26 which is actuated by the fluid motor is provided with segments which cooperate with stationary contacts to connect the driving motors 14 and 15 in series in its first position, and to connect them in parallel in its second position. These contacts and segments are also arranged to cooperate with the relay 22 to momentarily insert resistance in the shunt field of the generator when the motors are disconnected from the generator in transferring them from series to parallel so as to decrease the surge of current of the generator upon making the transfer. This surge in current is also limited by first connecting the motors 14 across the generator through a resistance and short circuiting the resistance when the motors 15 are connected across the generator in parallel with the motors 14.

The drum controller also includes contacts and segments for establishing a holding circuit for the valve actuating solenoids of the fluid motor independently of the voltage relay. With this arrangement fluctuations in the generator voltage subsequent to movement of the controller from its first position to its second position does not affect operation of the fluid motor but permits it to remain in its second position. If desired however the above described holding circuit may be dispensed with by the omission on the segment and contacts and by the provision of a voltage relay of a well known type which shall close at a predetermined voltage but which shall not open until a voltage considerably less than the closing voltage has been reached. With the use of a voltage relay of this type fluctuation of the generator voltage within an appreciable range would not cause undesirable frequent transfer and retransfer of the motor circuit connections within the normal operating range of generator voltage.

The motors 14 and 15 are connected across the generator in series through stationary contacts 48 which are bridged in the first position of the controller by a movable segment 49 carried by the controller drum. As pointed out above it is desirable to insert resistance in the generator shunt field exciting winding at the moment of transfer to limit the surge of generator current. This is done by providing a resistance 50 in the shunt field circuit which is arranged to be shorted by the contacts 51 of the relay 23. In the first position of the controller the relay 23 is closed to short the resistance 50 through contacts 52 of the voltage relay 32, contacts 53 and segment 54 of the drum controller, contacts 55 of the relay 24, contacts 21' of relay 21, and the contacts of the master controller 25 in either position. When the voltage of the generator in starting reaches the predetermined value required to actuate the relay 32 the contacts 52 thereof are opened which causes the contacts 51 of the relay 23 to open so as to insert the resistance 50 in the generator shunt field circuit. This is again short circuited by the relay 23 when the controller is moved to its second position. This actuation of the relay 32 also closes contacts 56 thereof which connects the actuating solenoids 46 and 47 of the fluid motor of the controller to the battery 20 through the master switch 25 in its second position only, and which will not change the series motor circuit connections if the master controller 25 has been placed in its first position by the operator. If the master controller 25 is in its second position this actuation of the relay 32 will energize the solenoids 46 and 47 so as to move the drum controller to its second position. This movement initially opens contacts 53, and also opens the contacts 48 which breaks the series circuit between the motors 14 and 15 and the generator 11. Upon a slight further movement of the controller contacts 57 are bridged by a segment 58 to complete a holding circuit for the solenoids 46 and 47. Simultaneously therewith contacts 59 are bridged by the segments 60 to connect the motors 14 across the generator 11 through the current limiting resistance 61. Upon completion of the movement of the controller to its second position contacts 62 and 53 are bridged by a segment 63 to close the relay 23 so as to short circuit the resistance 50 and increase the excitation of the generator shunt field exciting winding. In this second position of the controller contacts 64 and 65 are bridged by segments 66 and 67 respectively which connects the motors 14 and 15 in parallel across the generator 11 and short circuits the resistance 61.

Accordingly my invention provides for a voltage responsive device which shall operate to effect transfer of the operating motors from series to series-parallel during the starting or accelerating period of the vehicle, and to automatically effect the transfer at a predetermined voltage which shall be most suitable under the particular requirements.

I do not desire my invention to be limited to the particular construction set forth, and I intend in the appended claims to cover all modifications which do not depart from the spirit and scope of my invention.

What I claim as new and desire to secure by Letters Patent of the United States, is:

1. A power system including a plurality of driving motors, a generator for supplying current to said motors, motor circuit connections for relating said motors to said generator in series or parallel arrangement, and means for preventing change in said motor circuit connections until a predetermined voltage is attained in the system and for effecting change in the motor circuit connections at said predetermined voltage.

2. A power system including a plurality of driving motors, a generator for supplying current to said motors, motor circuit connections for relating said motors to said generator in series or parallel arrangement, and means including a relay responsive to generator voltage for preventing transfer of said motor circuit connections from series to a parallel arrangement until said generator has attained a predetermined voltage and for causing transfer of said motor circuit connections from series to parallel when said generator has attained said predetermined voltage.

3. A power system including a plurality of driving motors, a generator for supplying current to said motors, motor circuit connections for relating said motors to said generator in series or in series-parallel arrangement means for effecting transfer of the motor circuit connections from series to a series-parallel arrangement, and means for preventing transfer of said motor circuit connections until said system has attained a predetermined voltage, and for causing transfer of said motor circuit connections from series to parallel when the system has attained said predetermined voltage.

4. The combination with a power system comprising an engine, an electric generator driven thereby and a plurality of driving motors, motor circuit connections for relating said motors to said generator in series or parallel arrangement of motor control means comprising a voltage responsive device for preventing change in said motor circuit connections until said generator has attained a predetermined voltage and for causing transfer of said motor circuit connections from series to parallel when said generator has attained said predetermined voltage.

5. The combination with a power system comprising an engine, an electric generator driven thereby and a plurality of driving motors, of means for effecting transfer of the motor circuit connections during the starting period from series to a series-parallel arrangement, and motor control means comprising a relay for preventing transfer of said motor circuit connections until said generator has attained a predetermined voltage and for causing transfer of said motor circuit connections from series to series parallel when said generator has attained said predetermined voltage.

6. A power system comprising an engine, an electric generator driven thereby, a plurality of driving motors connected to said generator, motor circuit connections for relating said motors to said generator in series or series-parallel arrangement, and means for preventing transfer of the motor circuit connections during the starting period of the vehicle from series to a series-parallel arrangement until said generator has attained a predetermined voltage and for causing transfer of said motor circuit connections from series to series-parallel arrangement when said generator has attained said predetermined voltage.

7. A power system comprising an engine, an electric generator driven thereby, a plurality of driving motors connected to said generator, motor circuit connections for relating said motors to said generator in series or parallel arrangement and means including a voltage relay and a fluid motor controlled thereby for preventing change in said motor circuit connections until a predetermined voltage of the system and for changing said motor circuit connections at said predetermined voltage of the system.

8. A power system comprising an engine, a plurality of electric driving motors, a generator driven by said engine for supplying current to said motors, means including a pneumatic motor having solenoid valves for effecting transfer of the motor circuit connections from series to a series-parallel arrangement and for inserting a current limiting resistance in the circuit of some of said motors during the aforesaid transfer period, and means including a control circuit associated with said solenoid valves for preventing energization of said solenoid valves until said generator has attained a predetermined voltage and for energizing said solenoid valves when said generator has attained said predetermined voltage to transfer said motor circuit connections.

In witness whereof, I have hereunto set my hand this 28 day of August, 1929.

ROBERT T. SAWYER.